United States Patent [19]

Branch, III

[11] Patent Number: 4,719,021

[45] Date of Patent: Jan. 12, 1988

[54] SHALE-STABILIZING DRILLING FLUIDS AND METHOD FOR PRODUCING SAME

[75] Inventor: Homer Branch, III, New Orleans, La.

[73] Assignee: Sun Drilling Products Corporation, Belle Chasse, La.

[21] Appl. No.: 919,587

[22] Filed: Oct. 16, 1986

Related U.S. Application Data

[63] Continuation of Ser. No. 675,832, Nov. 28, 1984, abandoned.

[51] Int. Cl.$^4$ .................................................. C09K 7/02
[52] U.S. Cl. .................................. 252/8.514; 252/8.51
[58] Field of Search .................. 252/8.51, 8.514, 8.551

[56] References Cited

U.S. PATENT DOCUMENTS

| | | | |
|---|---|---|---|
| 3,086,937 | 4/1963 | Fischer | 252/8.51 |
| 3,762,485 | 10/1973 | Chesser et al. | 175/65 |
| 3,843,524 | 10/1974 | Perricoue et al. | 252/8.51 X |
| 4,090,968 | 5/1978 | Jackson et al. | 252/8.511 |
| 4,098,700 | 7/1978 | Hartfiel | 252/8.511 |
| 4,356,096 | 10/1982 | Cowan et al. | 252/8.551 X |
| 4,440,649 | 4/1984 | Loftin et al. | 252/8.51 |
| 4,457,372 | 7/1984 | Doster et al. | 166/272 X |

FOREIGN PATENT DOCUMENTS 1135493  11/1982  Canada ................................ 252/8.5

*Primary Examiner*—Herbert B. Guynn
*Attorney, Agent, or Firm*—Finnegan, Henderson, Farabow, Garrett & Dunner

[57] ABSTRACT

Shale-stabilizing drilling fluids for use in connection with subterranean well drilling operations. The drilling fluids contain polyvalent metal/guanidine complexes, especially aluminum/guanidine complexes, and preferably contain guanidinium ion and aluminate ion accompanied by (a) cationic starches and (b) a glycol selected from the group consisting of polybutylene glycol, polyethylene glycol, polypropylene glycol and mixtures thereof.

8 Claims, No Drawings

SHALE-STABILIZING DRILLING FLUIDS AND METHOD FOR PRODUCING SAME

This application is a continuation of application Ser. No. 675,832, filed Nov. 28, 1984, now abandoned.

BACKGROUND OF THE INVENTION

1. Field of the Invention

This invention relates generally to water-based, solids-containing fluids and more particularly concerns drilling fluids and drilling fluid additives that inhibit the hydration of colloidal clays, such as shales, gumbos and related geologic formations.

2. Description of the Prior Art

In recent years, the importance of drilling for oil, gas and other valuable earth-bound formations has increased. Unfortunately, such drilling is an unpredictable, expensive and often frustrating endeavor.

In the formation of a subterranean well, a drilling fluid is circulated to the bottom of a borehole and ejected into the borehole from a drill bit. The drilling fluid usually returns to the surface of the well through the annulus of the borehole. Alternatively, the drilling fluid rises to the surface from the bottom of the borehole through a drill stem. At the surface, the drilling fluid is chemically and mechanically treated to provide desired properties for recycling. Additional fluid and additives can be incorporated at the surface to enhance performance.

To perform the boring operation effectively, the drilling fluid must possess a variety of properties. For example, the drilling fluid should be capable of (1) transporting the cuttings, resulting from the drilling operation, out of the borehole; (2) cooling and lubricating the drill bit; (3) providing hydrostatic pressure to the borehole to prevent the hole from caving in or blowing out while using drilling fluids in a high pressure environment; (4) providing a wall cake upon the borehole wall; (5) avoiding excessive amounts of fluid loss during drilling operations; and (6) suspending the solid particles from the drilling operation when the drilling fluid ceases to circulate in the borehole.

As is well-known, aqueous-based drilling fluids are usually comprised of water and one or more additives or dispersants such as colloidal solids, non-colloidal solids, chemical dispersants, thinners, and dissolved salts. Water alone has been used in drilling short distances, but it lacks the lubricity, lifting power and hole-supporting properties provided by conventional deep well additives. Hence, solids-containing fluids with greater density, lifting power, and hole-supporting properties than water are often employed as drilling fluids. The properties of drilling fluid may be affected by the types of rocks through which the subterranean well is drilled. Usually, the viscosity, temperature, and pressure of the fluid are altered as the borehole is drilled through a rock formation.

Various additives and dispersants have been proposed that provide the requisite properties in drilling fluids. For example, bentonite, lignite, phosphate, and lignosulfonate-containing materials are often added.

Bentonite gives the fluid a thixotropic or gel structure. Lignite is added to the drilling fluid to control the thixotropy of the drilling fluid. Phosphate additives deflocculate colloidal solids and thin the drilling fluid. Like lignite, phosphate additives lose their effectiveness as temperature and pressure of the drilling fluid increase. Lignosulfonates are also used as a drilling fluid additive and exhibit good deflocculating properties when used in calcium or salt-containing drilling fluids.

In drilling, it is often softer rock formations which present the greatest problems, especially colloidal clays, such as shales and gumbos, which have a tendency to hydrate and swell when exposed to aqueous solutions. This swelling results in the formation of gummy, sludge-like paste in the drill hole which reduces the cutting efficiency of the drill bit, thickens and impedes the circulation of drilling fluid, plugs circulation and otherwise delays progress.

When the circulation of drilling fluid is impeded, a substantial amount of cuttings can build up in the hole and exert pressure against the rotating drill string. Hence, more torque is required to maintain the rotary motion of the drill. This is particularly true in drilling shales and related rock types where not only does the volume of the cuttings increase when hydrated, but the absorption of water from the drilling fluid and dispersion of the shale increase both the viscosity of the circulating fluid and the torque demand on the drilling unit. Occasionally, enough pressure can be exerted to cause the string to break or separate, and the resultant down time can cost tens of thousands of dollars per day.

Another problem is that shale and gumbo cuttings can stick to the surface of the drill bit and reduce its cutting efficiency by forming a layer between the bit and the formation being drilled. This phenomenon, sometimes called "balling up," results in a substantial decrease in drill penetration rate and adds to overall costs.

Still another problem associated with drilling these formations is the "cleanness" or "gauge" of the drill hole. Often, the walls of the hole collapse or become coated with hydrated cuttings. This makes it difficult to analyze the geologic structures penetrated.

Conventionally, an "electro log," including a radioactive source and detection mechanism, (or some other means of measuring the characteristics of the formations being drilled), is lowered down the hole and a chart is used to record data on the rock formations over the length of the hole. While drilling colloidal clays, however, the sludge of hydrated cuttings may stop the progress of the logging device, or impede its operation.

To alleviate the difficulties associated with drilling different types of geologic formations, various drilling fluid additives have been proposed that decrease friction, improve fluid circulation, seal up empty pockets in the earth, prevent cave in, decrease water loss and exhibit hydration. In addition to some of the additives mentioned above, chemical thinners and water loss control agents have been added to drilling fluid to increase flow and improve circulation. Lubricants, plastic particulates, and fibrous additives have also been used to reduce friction or shore up the walls of the drill hole to prevent collapse.

It has previously been discovered that exposing colloidal clays such as shales, gumbos and like formations to substantial concentrations of polyvalent metal ions can inhibit swelling and absorption of water. Generally, the polyvalent metal ions are complexed with a chelating agent prior to adding them to the drilling fluid. The ions are generally more resistant to fluctuations in pressure and temperature than are many of the agents previously discussed.

Unfortunately, a number of the polyvalent metal complexes currently used to inhibit hydration are not as effective as desired. Many also require the addition of large amounts of caustic materials because the acidic character of the complexes creates a danger that persons handling them will be chemically burned and because it is often desirable for drilling fluids to have an alkaline pH. The danger of burns is especially high in the close-quartered environment of an off-shore drilling platform where, due to the confined nature of the work place, the likelihood of coming into contact with materials present on the rig is high.

One type of polyvalent metal colloidal clay-stabilizing additive is described in Chesser et al., (U.S. Pat. No. 3,762,485), directed to a process for inhibiting the swelling of shale, including: (1) forming polyvalent metal ion complexes with agents selected from the class consisting of acetic, citric, formic, lactic, oxalic, and tartaric acids and metal and ammonium salts thereof and (2) adjusting to a pH above 7.0.

However, it is still desired to further reduce hydration in colloidal clays and to avoid adding relatively large amounts of sodium or potassium hydroxide or other caustics to neutralize the complex and to achieve an alkaline pH. As might be expected, each unit of hydroxide or other neutralizing agent increases both supply costs of the drilling operation and the need for transportation and storage space.

Generally, it is desirable to adjust the pH of the drilling fluid to an alkaline value during drilling operations, and caustic soda, potash or related alkali metal hydroxides are used. The caustics are normally added to the drilling fluid at the surface of the well. The presence of acidic agents increases the amount of caustic material necessary to achieve a high pH.

Hence, a drilling fluid composition which more effectively inhibits hydration in colloidal clays and which requires smaller amounts of caustic materials is desirable.

SUMMARY OF THE INVENTION

It is accordingly an object of the present invention to provide drilling fluid compositions which more effectively inhibit hydration when used in drilling colloidal clays, such as shales, gumbos and like formations.

Another object of the invention is to provide stabilizing agents which require less neutralizing material than complexes currently in use.

Another object is to provide colloidal clay-stabilizing drilling fluids which advance drill penetration rates and improve the quality of the drill holes.

Still another object is to provide a colloidal clay-stabilizing drilling fluid composition which can be used in conjunction with other drilling fluid additives to achieve desired properties.

Another object is to provide solids-containing fluids with hydration-inhibiting activity. These fluids may have applications in the field of ceramics or in other areas where shales, gumbos or clay-like rock formations are used. As such, these fluids are not limited to drilling fluids.

Yet another object is to provide a process for producing water-based solids-containing fluids with hydration-inhibiting activity.

Additional objects and advantages of the invention will be set forth in the description that follows and in part will be obvious from the description, or may be learned by practice of the invention. The objects and advantages of the invention may be realized and obtained by instrumentalities and combinations particularly pointed out in the appended claims.

To achieve these objects and in accordance with the purpose of the invention, the present invention provides a composition comprising a mixture of a solids-containing fluid and at least one polyvalent metal/guanidine complex in an amount effective to stabilize colloidal clays.

The process of the present invention for the production of a colloidal clay-stabilizing solids-containing fluid comprises the steps of (1) incorporating at least one polyvalent metal/guanidine complex in a solids-containing fluid; and (2) adjusting the pH of the resultant fluid to between 9 and 12.

In further accordance with the present invention, the solids-containing fluid composition comprises a mixture of:

(a) a solids-containing fluid having at least one ingredient selected from the group consisting of bentonite, lignite, lignosulfonate, ferrite, lime, gypsum, fluorite, hematite, sodium carbonate, barite and carboxymethylcellulose, and (b) a mixture in an amount effective to stabilize colloidal clays comprising:

(i) at least one member from the group consisting of: sodium hydroxide; potassium hydroxide; thinner; cationic starch; polyethylene glycol; polypropylene glycol; and polybutylene glycol; and (ii) at least one complex from the group consisting of: complexes of guanidine and aluminum hydroxide gel; complexes of guanidine and sodium aluminate; complexes of guanidine hydrochloride and aluminum sulfate; and complexes of guanidine hydrochloride and aluminum phosphate.

DETAILED DESCRIPTION OF THE PREFERRED EMBODIMENTS

Reference will now be made in detail to the presently preferred embodiments of the invention, which together with the following examples, serve to explain the principles of the invention.

In accordance with the invention, a solids-containing fluid is mixed with at least one polyvalent metal/guanidine complex in an amount effective to stabilize colloidal clays. Colloidal clays include shales, gumbos and like formations.

The term "solids-containing fluid" as used in this application includes aqueous, organic or polymer-based fluids having solids therein.

Solids-containing fluid compositions are well-known, particularly for use as drilling fluid compositions, and are readily available commercially. Such fluids usually are water-based and, for example, contain an effective amount of at least one ingredient selected from the group consisting of bentonite, lignite, lignosulfonates, ferrite, lime, gypsum, fluorite, hematite, sodium carbonate, barite, and carboxymethylcellulose. Further, in some circumstances, useful solids-containing fluids may include polymer-based or organic-based fluids, particularly, polymer-based and organic-based drilling fluids. Less frequently used drilling fluid ingredients may also be useful in some circumstances.

The polyvalent metal of the complex is preferably selected from the class consisting of aluminum, iron, manganese, nickel, tin and zinc, though other polyvalent ions might also be used. The guanidine portion of the complex is preferably either guanidine or guanidine hydrochloride.

In accordance with the invention, a colloidal clay-stabilizing agent selected from the group consisting of at least one complex of guanidine and a polyvalent metal, preferably at least one complex of guanidine and aluminum, is added to a drilling fluid in an amount effective to stabilize colloidal clays. For example, guanidine or quanidine hydrochloride complexed with aluminum, iron, manganese nickel, tin or zinc may be used. Complexes of guanidine and aluminum hydroxide gel, sodium aluminate, aluminum sulfate and/or aluminum phosphate are particularly useful.

Generally, between 1 and 25 pounds, preferably, 5 and 25 pounds, of the complex(es) is (are) included per barrel of drilling fluid and constitute an amount effective to stabilize colloidal clay. To some extent, the amounts added depend upon the formation being drilled and the results sought to be obtained. It is recommended that smaller concentrations be used at first and be increased as needed or desired. However, one of ordinary skill in the art can readily determine an effective amount of complex for a particular application without undue experimentation. For best results, the pH of the mixture of fluid and polyvalent metal/guanidine complex(es) is adjusted to between about 9 and 12, preferably greater than about 10, and more preferably between 11 and 11.5.

Preferably, a cationic starch (such as Cato 2 cationic starch manufactured by the National Starch Company of Bridgewater, N.J.) may be present in the drilling fluid to enhance overall performance. The starch can be premixed with the complexes and added to the fluid or, may be added separately either before or after the addition of complexes. One of ordinary skill in the art can readily ascertain, without undue experimentation, the optimum amount of cationic starch to add. Roughly, about 3 pounds per barrel is preferred.

One advantage of premixing the starch is that a powdered pre-mix of cationic starch and at least one guanidine/polyvalent metal complex can be readily shipped and safely handled. For example, Cato 2 cationic starch can be mixed with one of the colloidal clay-stabilizing agents selected from the group consisting of: guanidine and aluminum hydroxide gel; guanidine and sodium aluminate; guanidine hydrochloride and aluminum sulfates; guanidine hydrochloride and aluminum phosphate; and guanidine sulfate and aluminum sulfate.

It is also desirable to include in the drilling fluid a glycol having an average molecular weight of about 200 to 4000. For example, a glycol may be selected from the group consisting of polyethylene glycol, polypropylene glycol, polybutylene glycol and mixtures thereof. The glycols also help to retard swelling. Ethylene glycol, propylene glycol and butylene glycol may also be included. Like the cationic starches, the glycol(s) can be premixed or added separately to the drilling fluid.

Other drilling fluid additives can be used in connection with the present invention, such as thinners, water loss control agents, sodium hydroxide, potassium hydroxide, bentonite, starches and water. Additionally, lignosulfonates, barite, hematite, and polymers such as carboxy methyl cellulose may be used. These additives are well-known and available through commercial supply houses and drilling supply wholesalers. They, too, can be premixed with the polyvalent metal complexes and added to the drilling fluid as a mixture, or they can be added separately.

Representative mixtures of additives and at least one complex that, when added to a drilling fluid, are effective at inhibiting hydration in shales comprise, by weight:

10 to 53% aluminum hydroxide gel, 2 to 30% guanidine, 20 to 50% cationic starch, 20 to 50% water and 5 to 20% polyethylene glycol;

35 to 83% sodium aluminate, 2 to 30% guanidine, 10 to 15% cationic starch and 5 to 20% ethylene glycol;

60 to 90% water, 1 to 15% sodium hydroxide, 1 to 15% potassium hydroxide, 1 to 10% bentonite, 1 to 15% thinner, 1 to 15% starch and 5 to 20% of at least one aluminum/guanidine complex;

30 to 63% aluminum sulfate; 2 to 30% guanidine hydrochloride; 10 to 50% cationic starch; 5 to 20% ethylene glycol; and 20 to 50% water;

30 to 68% aluminum phosphate; 2 to 30% guanidine hydrochloride; 10 to 50% cationic starch; and 20 to 50% water;

30 to 60% aluminum hydroxide; 2 to 30% guanidine; and 10 to 50% cationic starch; and 10 to 90% aluminum hydroxide; 0 to 50% of a glycol with an average molecular weight between 200 and 4,000 selected from the group consisting of polybutylene glycol, polypropylene glycol, polyutylene glycol and mixtures thereof; 10 to 60% of a starch selected from the group consisting of cationic, anionic amphoteric starches and mixtures thereof, 0 to 50% guanidine, 0 to 50% aluminum phosphate and 0 to 50% aluminum sulfate.

Other suitable mixtures include at least one member from the group consisting of: sodium hydroxide; potassium hydroxide; thinner; cationic starch; polyethylene glycol; polypropylene glycol and polybutylene glycol and at least one complex in an amount effective to stabilize shale selected from the group consisting of complexes of guanidine and aluminum hydroxide gel; complexes of guanidine and sodium aluminate; complexes of guanidine hydrochloride and aluminum sulfate and complexes of guanidine hydrochloride and aluminum phosphate.

While not being bound by theory, applicant believes that under pH conditions where the pH of the fluids is adjusted with caustic soda, potash, or similar material to between 9 and 12, the complexes separate into polyvalent metal ions and guanidinium ions both of which are effective at inhibiting shale hydration. For example, at a pH of about 10, complexes of aluminum and guanidine may form aluminate ions and guanidinium ions which are extremely effective at inhibiting shale hydration. Hence, as used herein, compositions which "contain" or "include" polyvalent/metal guanidine complexes and have an adjusted pH between 9 and 12 may actually contain both polyvalent metal ions and guanidinium ions which contribute to the surprisingly good inhibiting characteristics of the compositions. It is intended that the claims encompass both the ionic and complex situations.

The following examples of the present invention are intended to be merely exemplary of the present invention and not limiting.

EXAMPLE 1

Guanidinium aluminum sulfate hexahydrate is prepared by dissolving 342 grams of aluminum sulfate in 1,000 milliliters of water and adding 141 grams of guanidine sulfate to the solution. The solvent is evaporated by vacuum evaporation to yield a dried salt. Approximately 1 to 25 pounds of this salt are incorporated per barrel of drilling fluid to provide a shale-stabilizing drilling fluid with improved properties.

For example, a laboratory test using a standard drilling fluid mixture of one pound per barrel caustic soda, 35 pounds per barrel bentonite, 10 pounds per barrel lignite, and 2 pounds per barrel lignosulfonate was tested with and without the guanidinium aluminum sulfate hexahydrate complex. A bentonite cylinder was placed in each sample of fluid. After 1.5 days the bentonite cylinder decomposed in the untreated fluid, while the cylinder in the treated fluid remained intact. The bentonite cylinder still had not decomposed after twelve days in the treated fluid.

EXAMPLE 2

Ten grams of potassium hydroxide, 80 grams of sodium aluminate and 53 grams of aluminum sulfate are dissolved in 1000 milliliters of water. Approximately 66 grams of guanidine hydrochloride, and 20 grams of Cato 2 cationic starch are added, and the mixture is stirred.

A laboratory test using a standard drilling fluid mixture of 1 pound per barrel of caustic soda, 35 pounds per barrel of bentonite, 10 pounds per barrel of lignite and 2 pounds per barrel lignosufonate was tested with and without the mixture as described above. A bentonite cylinder was placed in each sample of fluid. After two days the bentonite cylinder decomposed in the untreated fluid, while the cylinder in the treated fluid remained intact for 21 days.

EXAMPLE 3

Approximately 5 to 10 pounds of the mixture of Example 2 is added per barrel of drilling fluid to provide a shale-stabilizing fluid with improved properties. For example, shale cuttings from a hole drilled using the improved fluid were much less hydrated and much more discrete than those obtained from wells drilled without the improved fluid. When tested, approximately 0.2 pounds of caustic soda were required per gallon of the product mixture to adjust pH from 8.4 to approximately 11.0. This represents a saving of approximately 4 pounds of caustic soda per pound of product used when compared to a shale control agent currently marketed by Milchem under the name Shaletrol 202 ®.

EXAMPLE 4

A mixture is formed by mixing 120 grams of aluminum sulfate, 25 grams of guanidine hydrochloride, 60 grams of sodium hydroxide, and 20 grams of Cato 2 cationic starch with 1000 milliliters of water. Between 1 to 25 pounds of this mixture would be incorporated per barrel of drilling fluid to yield a shale-stabilizing drilling fluid, which whenused, would substantially reduce the hydration of shales.

EXAMPLE 5

A mixture is formed by mixing with 120 grams of sodium aluminate, 30 grams of guanidine hydrochloride, 20 grams of Cato 2 cationic starch, 40 grams of polyethylene glycol (M.W. 200), and 500 milliliters of water. Between 5 and 25 pounds of the product of this mixture would be used per barrel of drilling fluid to yield a shale-stabilizing drilling fluid, which would substantially reduce hydration of shales.

EXAMPLE 6

100 grams of aluminum hydroxide gel is dry blended with 30 grams of guanidine hydrochloride and 30 grams of Cato 2 cationic starch. Approximately 10 pounds of the dried powder are added per barrel of drilling fluid to provide a shale-stabilizing fluid, which when used, would substantially reduce hydration of shales.

EXAMPLE 7

500 grams of dried sodium aluminate and 200 grams of dried Cato 2 cationic starch are blended together. Approximately 10 pounds of such a mixture is added per barrel of drilling fluid. Though lacking the shale-stabilizing effect provided by guanidine, the aluminate/starch mixture showed hydration-inhibiting properties when bentonite cylinders were tested.

EXAMPLE 8

Approximately 84 grams of sodium aluminate and approximately 550 grams of aluminum sulfate are blended together. Approximately 10 pounds of such a mixture would be added per barrel of drilling fluid to provide a shale-stabilizing fluid with hydration-inhibiting properties.

EXAMPLE 9

Approximately 300 grams of dried, powdered sodium aluminate are dry blended with approximately 100 grams of polyethylene glycol (M.W. 1000). Approximately 10 pounds of such a mixture would be added per barrel of drilling fluid to provide a shale-stabilizing fluid with improved properties.

EXAMPLE 10

Approximately 500 grams of sodium aluminate and 200 grams of guanidine hydrochloride are blended together. When a proportionate mixture is added to a drilling fluid in approximately 10 pounds per barrel, a shale-stabilizing drilling fluid is formed, which when used, substantially reduces hydration of the shales.

What is claimed is:

1. A solids-containing fluid composition comprising a mixture of:
   (a) an aqueous-based solids-containing fluid having at least one ingredient selected from the group consisting of bentonite, lignite, lignosulfonate, ferrite, lime, gypsum, fluorite, hematite, sodium carbonate, barite, and carboxymethylcellulose, and
   (b) a mixture in an amount effective to stabilize colloidal clays comprising:
      (1) 1 to 15% sodium hydroxide;
      (2) 1 to 15% potassium hydroxide;
      (3) 1 to 15% thinner;
      (4) 1 to 15% cationic starch;
      (5) at least one member selected from the group consisting of:
         (i) polyethylene glycol having an average molecular weight in the range of 200 to 4,000;
         (ii) polypropylene glycol having an average molecular weight in the range of 200 to 4,000;
         (iii) polybutylene glycol having an average molecular weight in the range of 200 to 4,000; and
         (iv) ethylene glycol;
      (6) 5 to 20% of at least one complex from the group consisting of:
         (i) complexes of guanidine and aluminum hydroxide gel;

(ii) complexes of guanidine and sodium aluminate;
(iii) complexes of guanidine hydrochloride and aluminum sulfate; and
(iv) complexes of guanidine hydrochloride and aluminum phosphate; and
(7) 60 to 90% water.

2. The composition of claim 1 wherein the pH of said drilling fluid is between about 9 and 12.

3. The composition of claim 1 wherein the pH of said drilling fluid is about 10 or greater.

4. A drilling fluid composition comprising
(a) a aqueous-based solids-containing fluid having at least one ingredient selected from the group consisting of bentonite, lignite, lignosulfonate, ferrite, lime, gypsum, fluorite, hematite, sodium carbonate, barite, and carboxymethylcellulose, and
(b) a mixture forming a complex of guanidine and aluminum, said mixture including by weight:
10–90% aluminum hydroxide;
0–50% of a glycol with an average molecular weight between 200 and 4000 and selected from the group consisting of polyethylene glycol, polypropylene glycol, polybutylene gylcol, and mixtures thereof;
10–60% of a starch selected from the group consisting of cationic starches and mixtures thereof;
1–50% guanidine;
0–50% aluminum phosphate; and
0–50% aluminum sulfate.

5. A solids-containing fluid composition comprising a mixture of:
(a) an aqueous-based solid-containing fluid having at least one ingredient selected from the group consisting of bentonite, lignite, lignosulfonate, ferrite, lime, gypsum, fluorite, hematite, sodium carbonate, barite, and carboxymethylcellulose, and
(b) a mixture in an amount effective to stabilize colloidal clays comprising:
10 to 53% aluminum hydroxide gel;
2 to 30% guanidine;
20 to 50% cationic starch;
20 to 50% water; and
5 to 20% polyethylene glycol, wherein said aluminum hydroxide gel and said guanidine form a complex 6. A solids-containing fluid composition comprising a mixture of:
(a) an aqueous-based solids-containing fluid having at least one ingredient selected from the group consisting of bentonite, lignite, lignosulfonate, ferrite, lime, gypsum, fluorite, hematite, sodium carbonate, barite, and carboxymethylcellulose, and
(b) a mixture in an amount effective to stabilize colloidal clays comprising:
35 to 83% sodium aluminate;
2 to 30% guanidine;
10 to 15% cationic starch; and
5 to 20% ethylene glycol, wherein said sodium aluminate and said guanidine form a complex.

7. A solids-containing fluid composition comprising a mixture of:
(a) an aqueous-based solids-containing fluid having at least one ingredient selected from the group consisting of bentonite, lignite, lignosulfonate, ferrite, lime, gypsum, fluorite, hematite, sodium carbonate, barite, and carboxymethylcellulose, and
(b) a mixture in an amount effective to stabilize colloidal clays comprising:
30 to 63% aluminum sulfate;
2 to 30% guanidine hydrochloride;
10 to 50% cationic starch;
5 to 20% ethylene glycol; and
20 to 50% water, wherein said aluminum sulfate and said guanidine hydrochloride form a complex.

8. A solids-containing fluid composition comprising a mixture of:
(a) an aqueous-based solids-containing fluid having at least one ingredient selected from the group consisting of bentonite, lignite, lignosulfonate, ferrite, lime, gypsum, fluorite, hematite, sodium carbonate, barite, and carboxymethylcellulose, and
(b) a mixture in an amount effective to stabilize colloidal clays comprising:
30 to 60% aluminum hydroxide
2 to 30% guanidine; and
10 to 50% cationic starch, wherein said aluminum hydroxide and said guanidine form a complex.

* * * * *